July 6, 1954  J. R. ALMOND  2,682,929
HYDRAULIC STEERING BOOSTER FOR VEHICLES
Filed April 3, 1952  4 Sheets-Sheet 1
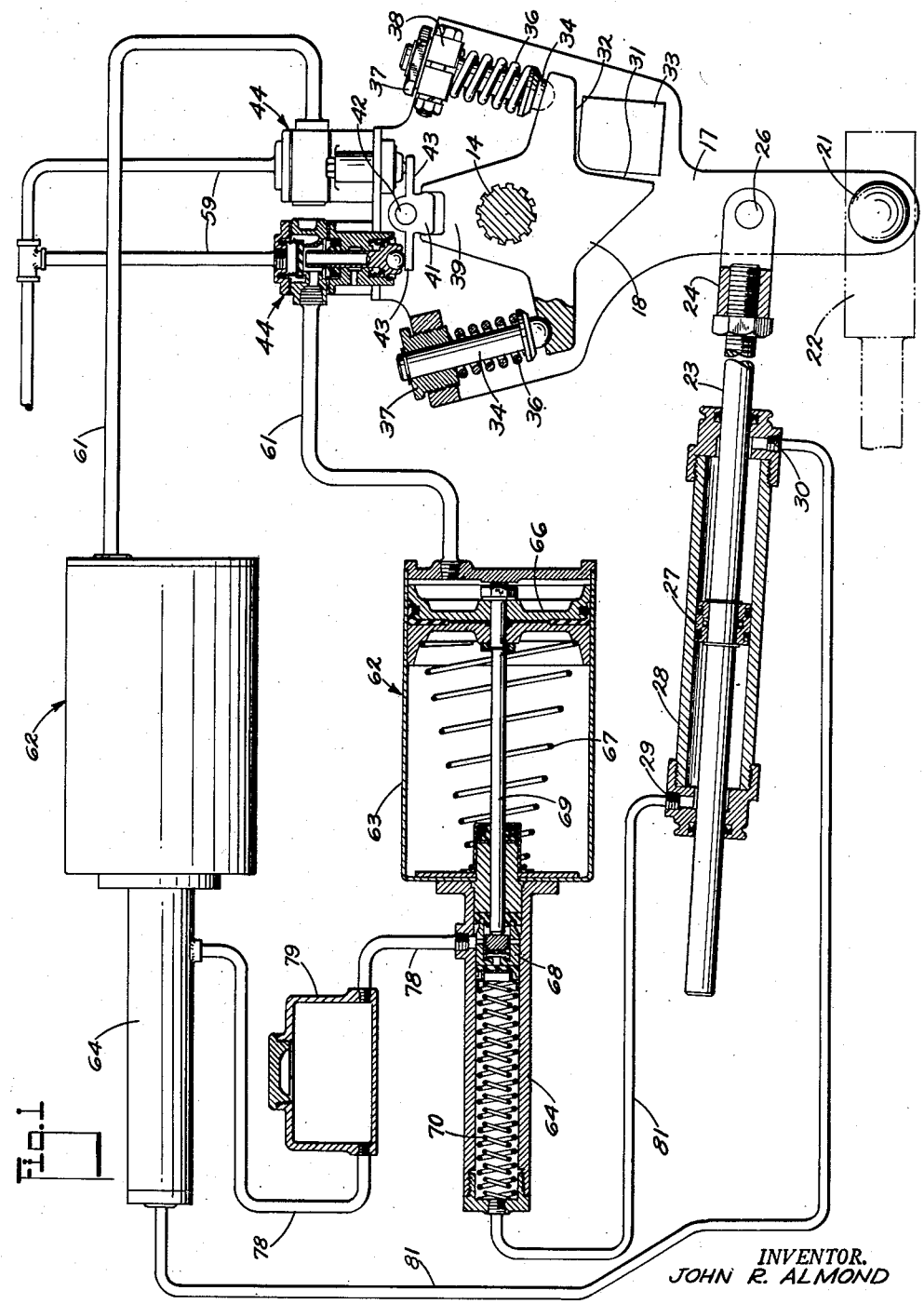
INVENTOR.
JOHN R. ALMOND
BY
RICHEY, WATTS, EDGERTON & McNENNY
A.D.Watts
ATTORNEYS July 6, 1954  J. R. ALMOND  2,682,929
HYDRAULIC STEERING BOOSTER FOR VEHICLES
Filed April 3, 1952  4 Sheets-Sheet 2
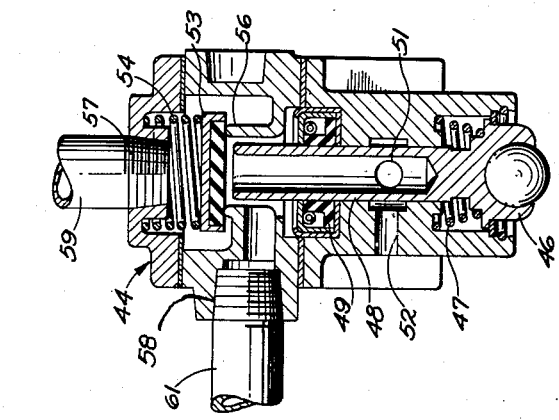
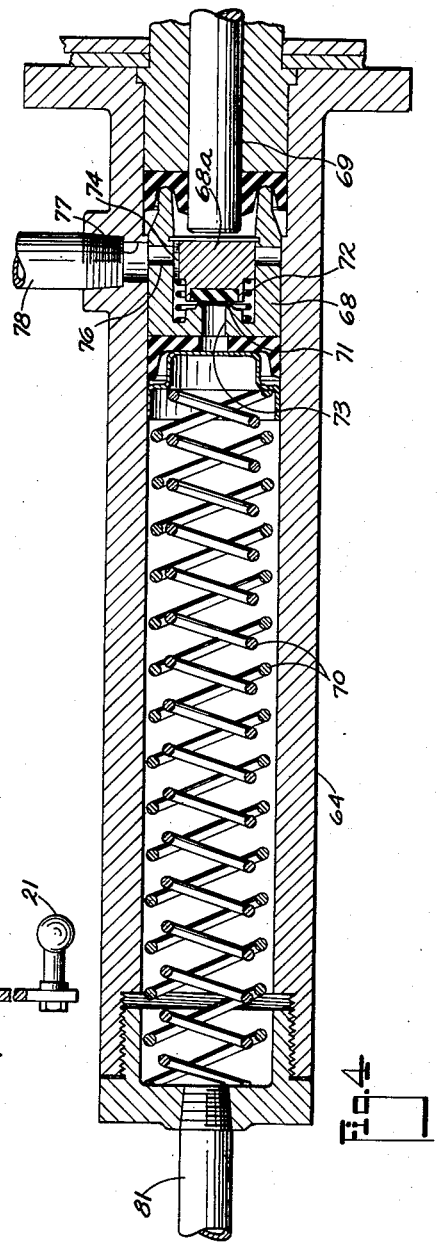
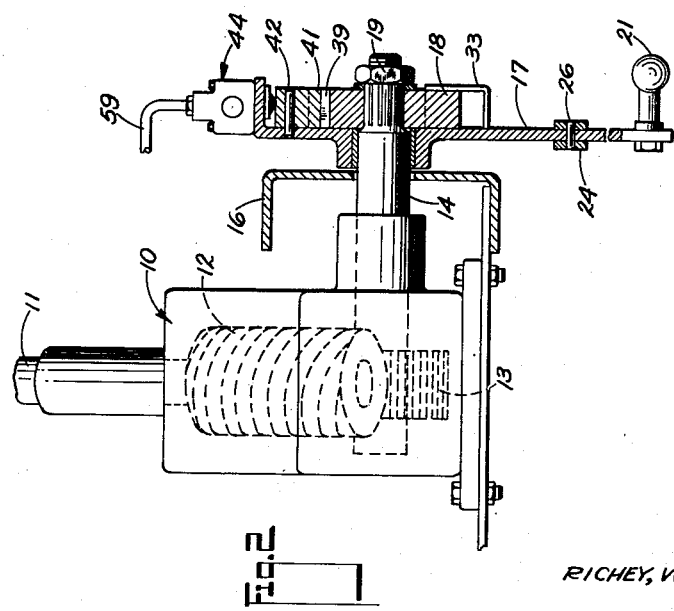
INVENTOR.
JOHN R. ALMOND
BY
RICHEY, WATTS, EDGERTON & McNENNY
A.D. Watts
ATTORNEYS

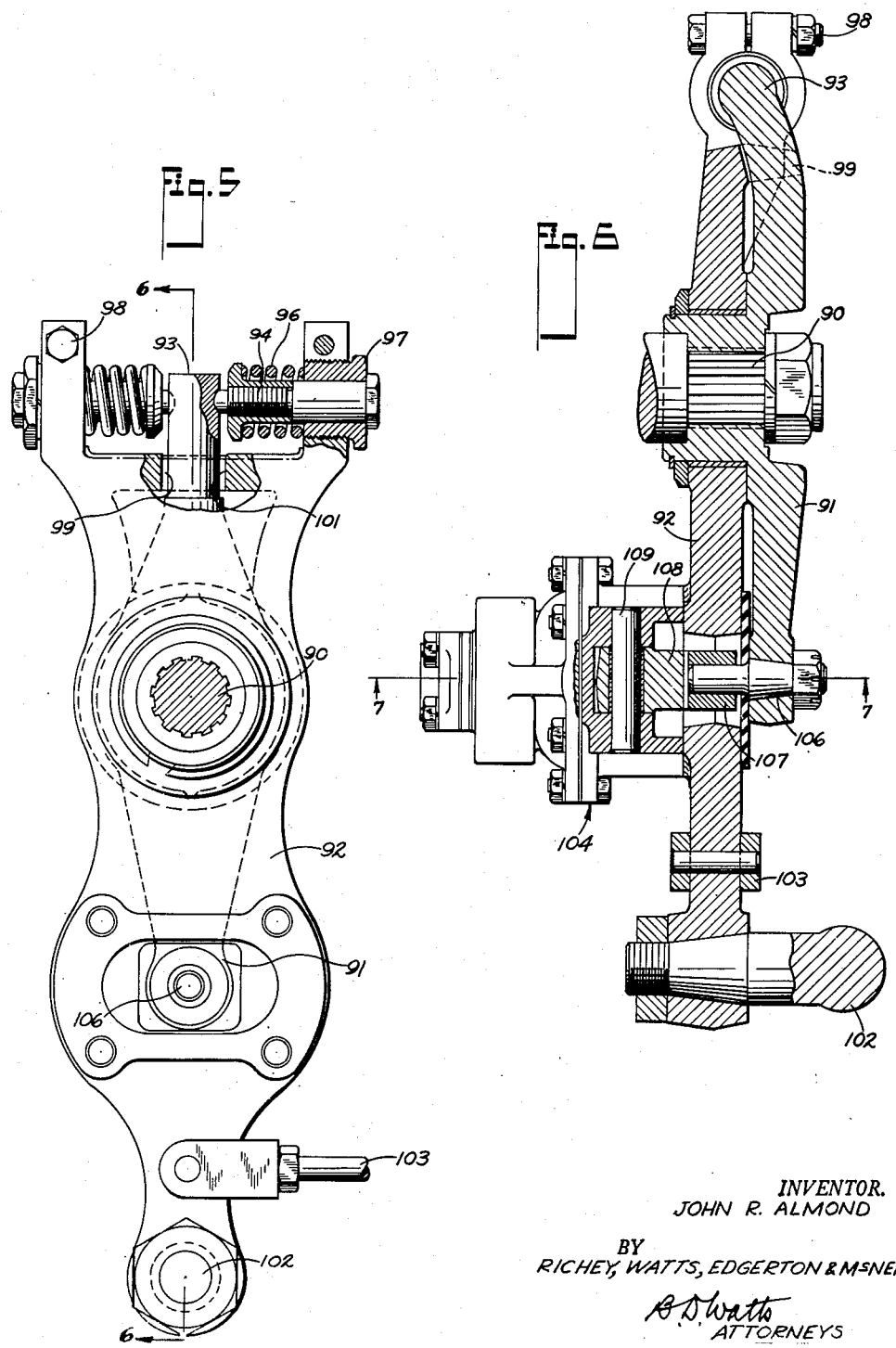

July 6, 1954   J. R. ALMOND   2,682,929
HYDRAULIC STEERING BOOSTER FOR VEHICLES

Filed April 3, 1952   4 Sheets-Sheet 4

INVENTOR.
JOHN R. ALMOND

BY
RICHEY, WATTS, EDGERTON & McNENNY

ATTORNEYS

Patented July 6, 1954

2,682,929

UNITED STATES PATENT OFFICE 2,682,929

HYDRAULIC STEERING BOOSTER FOR VEHICLES

John R. Almond, Detroit, Mich., assignor to The Midland Steel Products Co., Detroit, Mich., a corporation of Michigan Application April 3, 1952, Serial No. 280,429

7 Claims. (Cl. 180—79.2)

This invention relates to power steering devices for motor vehicles. It has been proposed to reduce the physical effort required to steer motor vehicles by providing a fluid motor connected into the steering system and actuated through a follow-up connection in response to manual control of the steering wheel.

Two types of systems have been generally proposed; namely, a system wherein the main power motor is a double-acting air cylinder, and a system wherein the power motor is a double-acting hydraulic cylinder. The air actuated system has an advantage in many vehicles, particularly commercial trucks or the like, in that on such vehicles means are customarily provided for maintaining a supply of air under pressure in order to actuate the vehicle brakes. Thus, advantage can be taken of the brake system for supplying the source of air under pressure necessary for the power steering system. This arrangement has the advantage in that no separate hydraulic pump and the driving means therefor are required. However, the steering air cylinder, being a double-acting device with the piston normally centered in the cylinder has been found to be somewhat sluggish and impositive in its action as opposed to the hydraulic system, it being understood that preciseness of control and instant response are of extreme importance in a power steering device.

The principal object of the invention resides in providing air actuated power steering systems that have the preciseness in operation characteristic of the hydraulic systems. This is accomplished by providing a pair of air actuated hydraulic booster units wherein the air pistons are normally disposed at one end of their cylinders thereby providing a small clearance volume and removing the sluggishness characteristic of the ordinary double-acting cylinder. The hydraulic booster cylinders are in turn connected to a double-acting hydraulic motor that operates the steering mechanism. Suitable follow-up motion is provided for controlling valves and admitting air to the air cylinders preferably including a lost motion connection between a manually controlled arm and the steering pitman arm.

Other objects of the invention reside in insuring that the device will remain under control of the operator as well as in providing a response or feel whereby the operator is conscious of the amount of steering attained in terms of force required to accomplish the same.

The manner in which these and other objects may be accomplished will be apparent in the following detailed description of a preferred embodiment of the invention.

In the drawings:

Fig. 1 is a diagram of the complete system;

Fig. 2 shows how the pitman arm is connected for manual control;

Fig. 3 shows one of the control valves;

Fig. 4 shows part of the booster unit;

Fig. 5 shows a pitman arm of a modified form of the invention with the control valves removed;

Fig. 6 is a section through the arm with the valves in place; and

Figure 7:
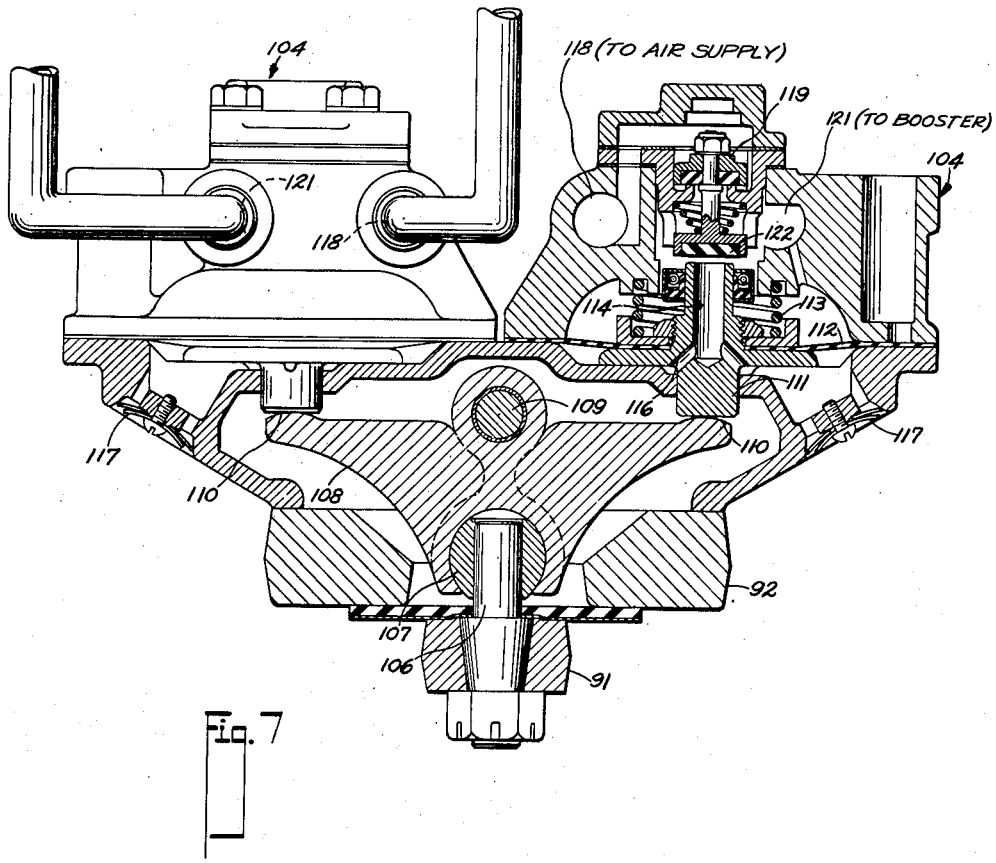
Fig. 7 is a section through the valves as indicated at 7—7 of Fig. 6.

Referring to Fig. 2, the usual steering box 10 receives the shaft 11 connected to the steering wheel and mounting the usual steering worm 12 geared to a sector 13 that oscillates the shaft 14 extending through the frame 16 of the vehicle. Details of the structure just described form no part of the invention, suitable apparatus being well known in the vehicle art.

Journaled on shaft 14 is the pitman arm 17 and splined to the end of the shaft 14 is a lever 18 which provides the manual control. The parts are retained in place by a suitable nut 19 threaded on the shaft. The pitman arm mounts the usual ball 21 for connection to a drag link 22, the details of the steering linkage forming no part of the invention suitable systems being well known in this art.

In order to provide power actuation for the pitman arm, piston rod 23 is provided with a clevis 24 pinned to the arm as at 26. Fixed to the rod is a piston member 27 sliding in a double-acting hydraulic cylinder 28 having opposed ports 29 and 30 serving alternately as inlet and outlet ports.

There is a lost motion connection between the manually controlled lever 18 and the power actuated pitman arm 17. This is attained by providing two shoulders 31 and 32 on the manually controlled lever which may alternately engage a lug 33 fixed on the pitman arm. The manually controlled lever 18 is normally centered relative to the lug 33 by means of opposed plungers 34 and springs 36 backed up by adjusting nuts 37. These nuts are adjusted until the desired centering action is produced whereupon they are clamped by means such as the split collar 38 and clamped by a suitable bolt to maintain the adjustment.

The manually controlled lever 18 is notched as at 39 to receive an extension 41 on a follow-up lever pivoted to the pitman arm as at 42. The latter lever has wings 43 for controlling two air valves 44. These valves are identical and each includes a plunger 46 extended by means of a spring 47 and having a hollow extension or sleeve 48 sliding within a sealing member 49. The extension 48 is ported as at 51 for connection to an exhaust port 52 in the valve body. A check valve 53 is urged by means of spring 54 against a valve seat 56. Inlet port 57 is formed for connection to an air tank or source of air under pressure and each valve has an outlet port 58.

As seen in the diagram of Fig. 1, inlet lines 59 are provided for connection to the air pressure source such as a pump and a reservoir tank and the outlet line 61 from each valve connection to the air cylinder of a booster unit 62. The booster unit includes an air cylinder 63 and a hydraulic cylinder 64 connected thereto. An air piston 66 slides in the air cylinder and is normally held adjacent the end wall of the air cylinder by a spring 67. A hydraulic piston 68 is mounted in the hydraulic cylinder and is operated by a piston rod 69 connected to the air piston, upon admission of air under pressure to the booster. The hydraulic piston is held against the piston rod by springs 70 in the hydraulic cylinder.

As best seen in Fig. 4, the hydraulic piston 68 includes a plunger 68a mounting a sealing washer for engaging a valve seat 71, a spring 72 being provided to normally hold the plunger away from the seat. A port 73 is formed in the piston 68 to permit the springs 70 to return the piston to its neutral position. The plunger 68a is notched as at 74 to provide communication between the port 73 and a port 76 formed in the piston. Hydraulic liquid is admitted to the hydraulic cylinder through a port 77 which connects by means of a line 78 to a reservoir 79. The booster units are of identical construction. Each booster unit has an outlet or a pressure line 81 connected to one end of the power or steering cylinder 28 by means of ports 29 and 30 respectively.

In operation, when the steering wheel is turned, lever 18 is moved independently of the pitman arm 17. Before the clearance in the lost motion connection is taken up, lever 43 lifts the plunger of one of the valves, depending upon the direction in which the manually controlled shaft 14 has been turned. This lifts the valve plunger bringing sleeve 48 against the check valve 53 sealing off the exhaust and opening the check valve to admit air through line 61 leading to the booster unit. A relatively small volume of air is required to actuate the booster unit because the piston 66 is close to the end wall of the air cylinder. The air piston now is forced to the left in the drawings whereby the piston rod 69 engages the plunger 68a in the hydraulic piston 68, forcing it against the valve seat 71 thereby closing the port 73 and presenting a solid piston to the fluid trapped within the hydraulic cylinder 64. This action takes place before the lost motion between shoulders 31 or 32 (as the case may be) and lug 33 is removed. So long as the manually controlled steering element is held in this offset position, pressure will be applied to the air cylinder which is, in turn, reflected in the transmission of hydraulic pressure from the hydraulic cylinder through one or the other end of the steering motor 28. This causes the pitman arm 17 to move in the desired direction thereby steering the vehicle in the usual manner. Motion of the pitman arm is also reflected back into the valve under actuation because the follow-up lever is pivoted to the pitman arm as at 42. Thus, assuming that the manually controlled lever 18 is moved to a given position and held there within the limits of the lost motion, the steering apparatus will impart an equal motion through the pitman arm restoring the valve that was actuated and the system immediately moves to the signaled position. Thus, the desired follow-up control and power actuation are attained.

Springs 36 on the pitman arm tend to center the manually controlled lever 18 and thus require a conscious effort on the part of the operator when he initiates and maintains steering action. These springs also tend to eliminate oscillation or hunting of the system. Thus it can be seen that in accordance with the invention, the disadvantages attendant upon the use of a double-acting air cylinder with a large dead air space are removed and yet the system can take advantage of the source of air under pressure normally provided in many vehicles particularly commercial vehicles such as trucks and the like.

In the form of the invention shown in Figs. 5 to 7, a somewhat different construction is employed that includes valve means that provide a feel or response to the operator in addition to that provided by the centering springs. The manually controlled shaft 90 corresponds to the shaft 14 in the other form of the invention and has splined thereto the manually controlled lever 91.

Journaled on the hub portion of the lever is the pitman arm 92 for connection to the steering apparatus. The manually controlled lever has an extension 93 engaged by opposed plungers 94 under the force of centering springs 96. These springs are backed up by adjusting nuts 97 with a clamp means 98 provided to maintain the adjustment. The lever 93 is thus centered between opposed shoulders 99 and 101 formed on the pitman arm thereby providing a lost motion connection. The pitman arm includes the usual ball 102 for connection to the drag link of the steering mechanism and the arm may be actuated by a piston rod 103 pivoted thereto extending from a double-acting hydraulic cylinder corresponding to the cylinder 28 of the other form of the invention. The steering motor may actually be connected to any suitable part of the steering linkage in both forms of the invention.

A pair of control valves 104 are bolted to the pitman arm and actuated by a follow-up lever similar to that employed in the other form of the invention. A pin 106 is mounted on the manually controlled lever 91 and (as best seen in Figs. 6 and 7) the pin is mounted in a ball 107 retained in a suitable socket in the follow-up lever 108. The latter is pivoted to the pitman arm as at 109 and has opposed ears 110 for actuating the valve. Each valve has a plunger 111 engaging ears 110 and clamped to a diaphragm 112 in the valve body. Springs 113 hold the plungers against the lever 108. The plungers include a sleeve 114 that connects to exhaust by a port 116 in the plunger and outlet 117 in the valve body. A port 118 connects to the air supply which is normally closed off by a check valve 119, spring-held against its valve seat.

Chamber 121 is provided for connection to the air cylinder of a booster unit like that previously described. A check valve 119 includes a soft seat 122 for engagement with a sleeve 114. As in the previously described system, the hydraulic cylinders of the booster units connect to opposite sides of a hydraulic actuating piston for operating the piston rod 103 to move the pitman arm and steer the vehicle. In operation, when the shaft 90 is turned manually some of the lost motion between shoulders 99 and 101 is taken up and the lever 108 operates one of the valve plungers. This brings the valve 114 against the check valve seat 122 closing off the exhaust and opening the valve to admit air from inlet 118 to chamber 121 and hence to the work chamber of the air cylinder on the booster unit.

Pressure in the valve body is also exerted against the diaphragm which in turn is reflected through the valve operating mechanism to the manually controlled arm and hence to the steering wheel being held by the operator. Thus, as long as the power device is in operation, a certain percentage of the force required to steer the vehicle is, in effect, impressed upon the manual system providing a response or feel to the operator. The mounting of the valves and the lever 108 on the pitman arm results in the device shutting itself off when the pitman arm is moved a given distance equal to the motion of the manually controlled arm 91.

The system just described also has the advantages of preciseness of control due to the construction of the booster unit and the arrangement of the units as has been described, and in addition, an additional follow-up or response action is made apparent to the operator assisting him and judging him to the action of the steering mechanism relative to the force required to turn the steering wheel. Of course, the follow-up action is not made strong enough to present any great amount of resistance to the steering operation and a mechanical advantage is present in the over-all operation of the system.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. In a power steering apparatus for motor vehicles having a manually-operated steering shaft, a pitman arm for connection to the wheels to be steered and adapted to be journaled for oscillation about said shaft, a lever adapted to be keyed to the shaft, a lost motion connection between said arm and lever, double-acting hydraulic motor means connected to said arm, a pair of single-acting booster units each unit comprising an air cylinder, a hydraulic cylinder, and a piston in each of said cylinders, and a rod between and engageable with both pistons, said hydraulic cylinders being connected respectively to opposed sides of said hydraulic motor means, valve means for controlling flow of air to said air cylinders, and means interposed between said arm and lever for controlling said valve means in accordance with relative motion of said arm and lever.

2. In a power steering apparatus for motor vehicles having a manually-operated steering shaft, a pitman arm for connection to the wheels to be steered and adapted to be journaled for oscillation about said shaft, a lever adapted to be keyed to the shaft, a lost motion connection between said arm and lever, a double-acting hydraulic steering motor, a pair of single-acting booster units each unit comprising an air cylinder, a hydraulic cylinder, and a piston in each of said cylinders, and a rod between and engageable with both pistons, spring means to urge said booster unit pistons to a position wherein the air piston is adjacent the end of its cylinder, said hydraulic cylinders being connected respectively to opposed sides of said hydraulic motor, valve means for controlling flow of air to said air cylinders, and means interposed between said arm and lever for controlling said valve means in accordance with relative motion of said arm and lever.

3. In a power steering apparatus for motor vehicles having a manually-operated steering shaft, a pitman arm for connection to the wheels to be steered and adapted to be journaled for oscillation about said shaft, a lever adapted to be keyed to the shaft, a lost motion connection between said arm and lever, opposed spring means connected to said arm and lever to center the latter relative to said lost motion connection, double-acting hydraulic motor means connected to said arm, a pair of single-acting booster units each unit comprising an air cylinder, a hydraulic cylinder, and a piston in each of said cylinders, and a rod between and engageable with both pistons, spring means to urge said booster unit pistons to a position wherein the air piston is adjacent to one end of its cylinder, said hydraulic cylinders being connected respectively to opposed sides of said hydraulic motor means, valve means for controlling flow of air to said air cylinders, and means interposed between said arm and lever for controlling said valve means in accordance with relative motion of said arm and lever.

4. In a power steering apparatus for motor vehicles having a manually-operated steering shaft, a pitman arm for connection to vehicle steering apparatus and adapted to be journaled for oscillation about said shaft, a lever adapted to be keyed to the shaft, a lost motion connection between said arm and lever, a double-acting hydraulic steering motor, a pair of single-acting booster units each unit comprising an air cylinder, a hydraulic cylinder, and a piston in each of said cylinders, and a rod between and engageable with both pistons, spring means to urge said booster unit pistons to a position wherein the air piston is adjacent to one end of its cylinder, said hydraulic cylinders being connected respectively to opposed sides of said hydraulic motor, a pair of valves for controlling flow of air to said air cylinders, and means interposed between said arm and lever for controlling said valves in accordance with relative motion of said arm and lever, said valves each having means responsive to operating pressure and opposing opening of the valve.

5. In a power steering apparatus for motor vehicles having a manually-operated steering shaft, a pitman arm for connection to vehicle steering apparatus and adapted to be journaled for oscillation about said shaft, a lever adapted to be keyed to the shaft, a lost motion connection between said arm and lever, a double-acting hydraulic steering motor, a pair of single-acting booster units each unit comprising an air cylinder, a hydraulic cylinder, a piston in each of said cylinders, and a rod between and engageable with both pistons, spring means to urge said booster unit pistons to a position wherein the air piston is adjacent to one end of its cylinder, said hydraulic cylinders being connected respectively to opposed sides of said hydraulic motor, a pair of valves for controlling flow of air to said air cylinders, and lever means pivotally mounted on said arm and engageable with said lever for controlling said valves in accordance with relative motion of said arm and lever.

6. In a power steering apparatus for motor vehicles a manually-operated steering member, a pitman arm member for connection to the wheels to be steered, a lost motion connection between said members, a double-acting hydraulic steering motor for connection to said pitman member, a pair of single-acting booster units each unit comprising an air cylinder, a hydraulic cylinder, and a piston in each of said cylinders, and a rod between and engageable with both pistons, spring means to urge said booster unit pistons to a position wherein the air piston is adjacent to one end of its cylinder, said hydraulic cylinders being connected respectively to opposed sides of said hydraulic motor, valve means mounted on one of said members for controlling flow of air to said air cylinders, and means pivoted on one of said members and engaging the other member for controlling said valve means in accordance with relative motion of said members.

7. In a power steering apparatus for motor vehicles having a manually-operated steering shaft, a pitman arm for connection to the wheels to be steered and adapted to be journaled for oscillation about said shaft, a lever adapted to be keyed to the shaft, a lost motion connection between said arm and lever, double-acting hydraulic motor means connected to said arm, a pair of single-acting booster units each unit comprising an air cylinder, a hydraulic cylinder, a piston in each of said cylinders, and a rod between and engageable with both pistons, said hydraulic cylinders being connected respectively to opposed sides of said hydraulic motor means, valve means for controlling flow of air to said air cylinders, said valve means comprising a pair of valve housings, valves in the housings, diaphragms in the housings and valve actuating plungers extending through and connected to the diaphragms, and means interposed between said arm and lever and engaging the plungers for controlling said valves in accordance with relative motion of said arm and lever.

References Cited in the file of this patent

UNITED STATES PATENTS

| Number | Name | Date |
|---|---|---|
| 2,018,197 | Vorech et al. | Oct. 22, 1935 |
| 2,313,704 | Hey | Mar. 9, 1943 |
| 2,424,806 | Eaton | July 29, 1947 |
| 2,440,794 | Bowling | May 4, 1948 |